No. 743,252. PATENTED NOV. 3, 1903.
W. B. COWLES.
APPARATUS FOR OPERATING WATER TIGHT POWER DOORS OR HATCHES.
APPLICATION FILED SEPT. 25, 1902.
NO MODEL. 3 SHEETS—SHEET 1.
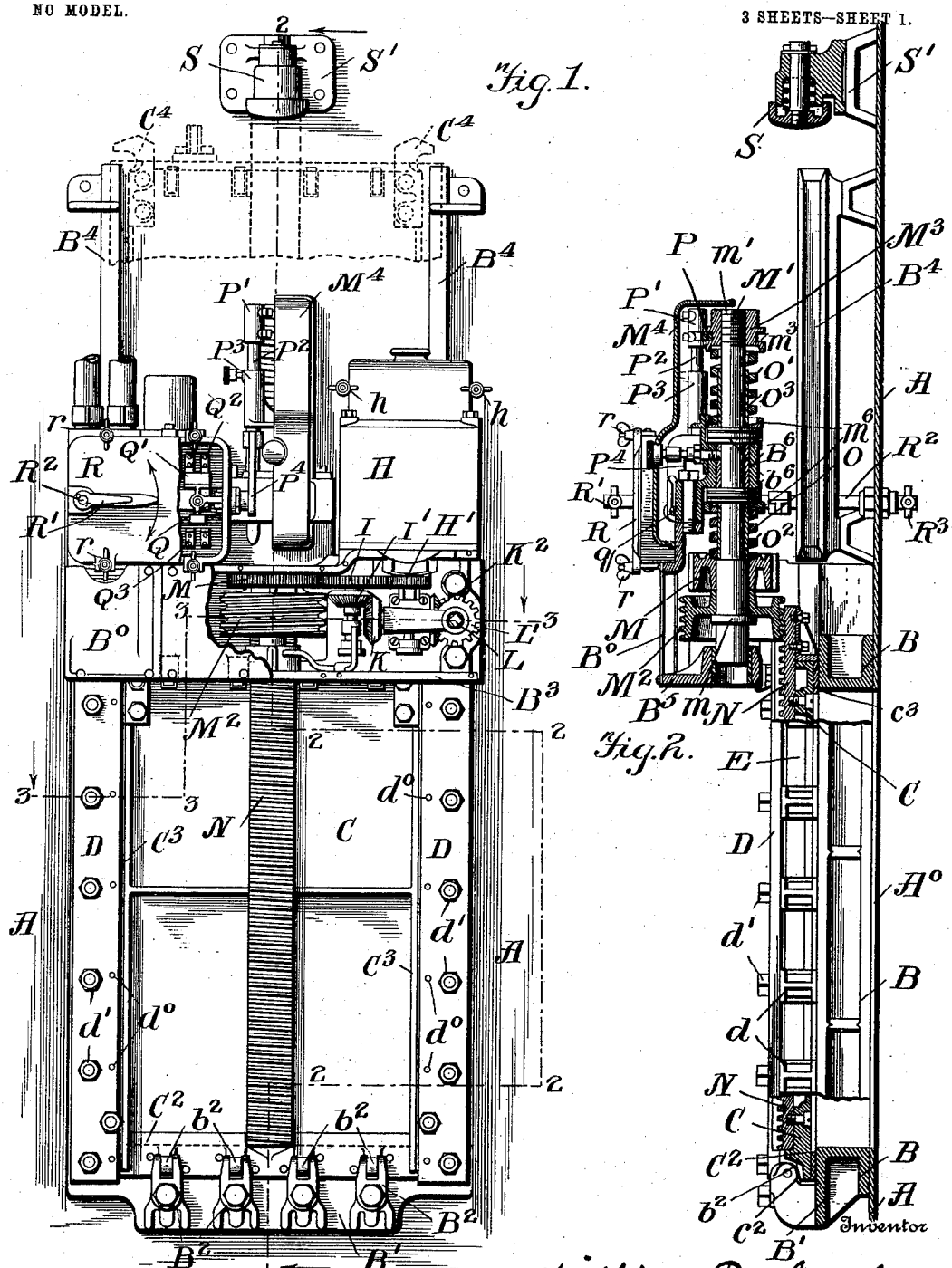

No. 743,252. PATENTED NOV. 3, 1903.
W. B. COWLES.
APPARATUS FOR OPERATING WATER TIGHT POWER DOORS OR HATCHES.
APPLICATION FILED SEPT. 25, 1902.
NO MODEL. 3 SHEETS—SHEET 2.
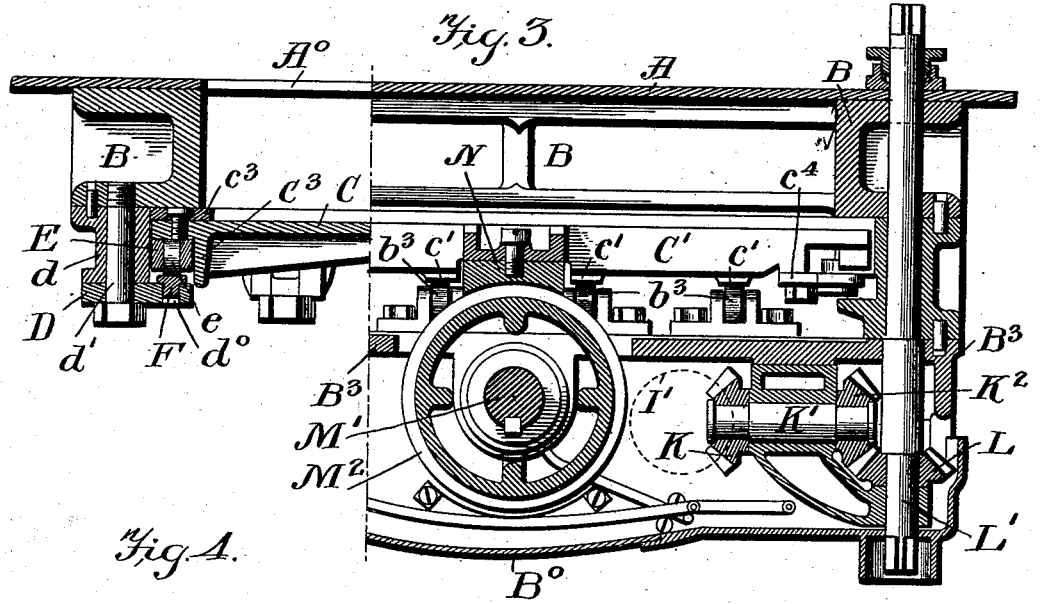
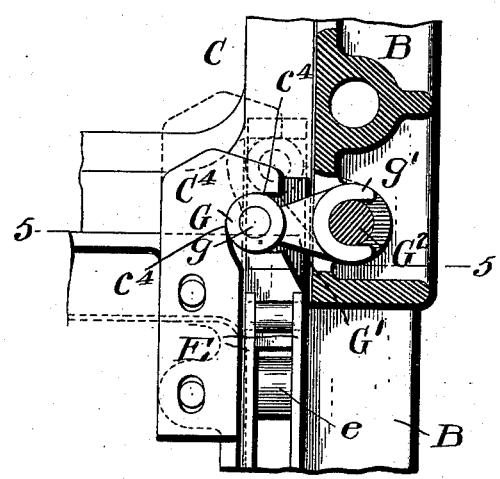
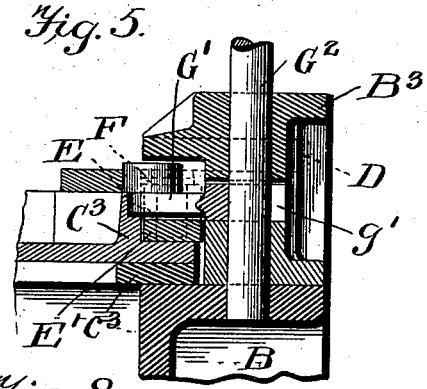
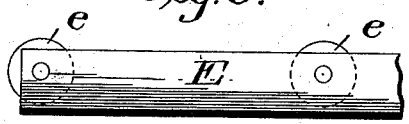
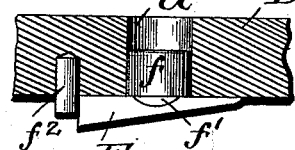
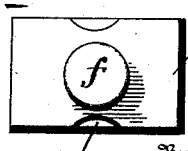

No. 743,252. PATENTED NOV. 3, 1903.
W. B. COWLES.
APPARATUS FOR OPERATING WATER TIGHT POWER DOORS OR HATCHES.
APPLICATION FILED SEPT. 25, 1902.
NO MODEL. 3 SHEETS—SHEET 3.
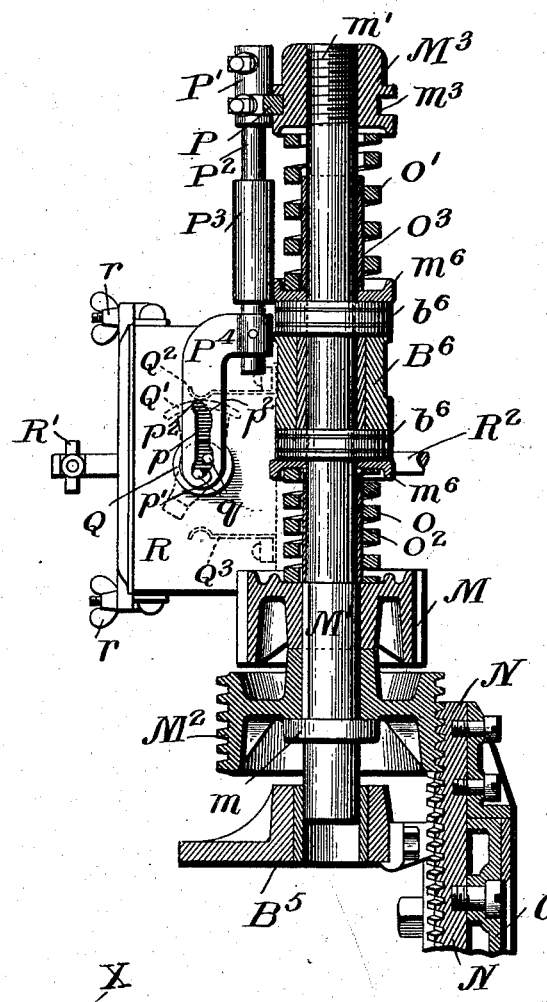
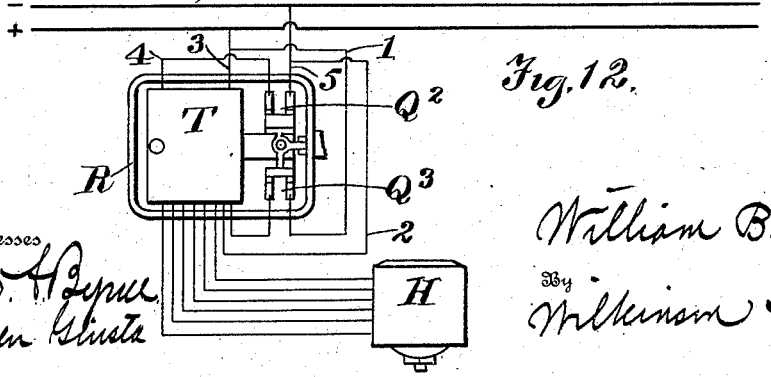

No. 743,252. Patented November 3, 1903.

UNITED STATES PATENT OFFICE.

WILLIAM BARNUM COWLES, OF CLEVELAND, OHIO, ASSIGNOR, BY MESNE ASSIGNMENTS, TO THE CLEVELAND TRUST COMPANY, TRUSTEE, OF CLEVELAND, OHIO, A CORPORATION OF OHIO.

APPARATUS FOR OPERATING WATER-TIGHT POWER DOORS OR HATCHES.

SPECIFICATION forming part of Letters Patent No. 743,252, dated November 3, 1903.

Application filed September 25, 1902. Serial No. 124,759. (No model.)

*To all whom it may concern:*

Be it known that I, WILLIAM BARNUM COWLES, a citizen of the United States of America, residing at Cleveland, in the county of Cuyahoga and State of Ohio, have invented certain new and useful Improvements in Apparatus for Operating Water-Tight Power Doors or Hatches; and I do hereby declare the following to be a full, clear, and exact description of the invention, such as will enable others skilled in the art to which it appertains to make and use the same.

My present invention relates to apparatus for operating water-tight doors or hatches either by electricity or by hand; and it is intended to provide certain improvements upon the apparatus described and claimed in my United States application, Serial No. 70,551, filed August 1, 1901, and entitled "Electrically-operated system for closing water-tight doors, hatches, or the like."

The present invention relates more especially to improvements in mechanism for moving the door in the automechanical cut-out for cutting off the current when the load on the electric motor becomes excessive and in certain improved means for wedging the door tight on its seat when closed and for readily releasing the same from its seat at the beginning of the opening operation.

My invention further consists in certain novel details of construction and combinations and arrangements of parts that will be hereinafter described and claimed.

In the accompanying drawings I have shown the invention as applied to a vertically-sliding door; but it is equally applicable to a horizontal-sliding door or hatch.

Referring now to the drawings, in which like parts are indicated by similar letters throughout the several views, Figure 1 is a front elevation of a vertically-sliding door and its frame and operating mechanism, parts being broken away. Fig. 2 is a section along the broken line 2 2 of Fig. 1 and looking in the direction of the arrows. Fig. 3 is a section along the broken line 3 3 of Fig. 1 and looking in the direction of the arrows. Fig. 4 is a detail, to a larger scale, showing the method of wedging the door on its seat as the door nears the closed position. Fig. 5 shows a section along the line 5 5 of Fig. 4 and looking in the direction of the arrows. Figs. 6 and 7 are details, to a small scale, showing the roller-bars and rollers. Figs. 8, 9, and 10 are details, to a larger scale, showing wedges with which rollers engage. Fig. 11 is an enlargement of a portion of Fig. 2 and shows the automechanical cut-out. Fig. 12 is a semidiagrammatic view showing the electric circuits connecting the controller, limit-switch, and motor.

A represents the bulkhead, with the usual door-opening $A^0$, to which the door-frame B is secured. This door-frame must be very rigid to prevent buckling when pressure is applied, as from a compartment full of water.

C represents the door-plate, which is constructed with stiffening-ribs around the edges thereof, as indicated at $C'$, $C^2$, and $C^3$. The upper rib $C'$ carries wedges $c'$, which engage in rollers $b^3$, fast to the bridge $B^3$, which spans from side to side of the door-frame, as shown in Fig. 3. The lower rib $C^2$ also carries wedges $c^2$, which engage the rollers $b^2$ on the roller-bracket $B^2$, fast to the sill $B'$ of the door-frame, as shown in Figs. 1 and 2. The door is moved up and down in the space between the face of the door-frame B and the guide-gibs D, which gibs are spaced from the frame by the chairs $d$ and the bolts $d'$. On the inner side of these gibs, at short intervals of preferably not over six inches apart, I provide wedges F, (shown in detail in Figs. 8, 9, and 10,) which have a boss $f$, which projects into an opening $d^0$ in the guide-gibs D. These wedges are kept from turning by means of dowel-pins $f^2$. For convenience of removal the wedges are beveled or cut away at $f'$, so that they may be gripped by a pair of nippers and removed when desired.

Mounted in the space between the rib $C^3$ on the door and the chair $d$ are the roller-bars E, between which are journaled the rollers $e$. Just before the door is closed these rollers are forced to ride up on the wedges F, and thus press the door on its seat, causing the non-corrosive seating-strip $c^3$, fast to the door, to form a water-tight joint with the doorframe. The manner in which these rollers e are caused to ride upon the wedges F is shown in Figs. 3 to 5. The roller-bars E are connected by a link or wrist-block E', which engages the boss of crank-pin g of the crank G', which crank has a fork g', embracing the bolt G². The door-plate carries two adjustable hook-plates C⁴, one on either side, which engage the corresponding rollers G on the crank-pin g. In Figs. 4 and 5 the parts are in the position they would occupy when the door-plate is closed and locked on its seat. Now suppose the door-plate to be opened or moved in the direction indicated by the arrows in Fig. 4. The curved face c⁴ of the hook-plate C⁴ would push the roller G to the right, causing the crank G' to dip down to the position indicated in dotted lines in Fig. 4. This would drag the roller-bars to the right, causing the rollers to become disengaged from the wedges and allowing the doorplate to be readily moved. As soon as the parts get to the position indicated by dotted lines in Fig. 4 the roller G is out of the way of the hook-plate C⁴ and door-rib C³ and the short travel of the roller-bars is at an end. In closing the door the arm G' remains in the position indicated by dotted lines in Fig. 4 until the hook-plate C⁴ reaches this roller, and this will take place almost at the end of the travel of the door-plate toward closure. The further motion of the door-plate in closing will drag along the arm G' to the position indicated in full lines in Fig. 4, causing the rollers e to ride up on the wedges F and forcing the door-plate hard against its frame-seat. At the same time that the side rollers and wedges are acting the top and bottom rollers and wedges are also in engagement, and the door-plate is wedged firmly on its seat all around its periphery. By having the rollers and wedges located at short distances apart any leaks due to buckling of the door-plate from water-pressure are avoided.

I have thus described my improved method of tightening the door on its seat. I will now proceed to describe the mechanism by means of which the door is moved and the means by which that mechanism is thrown out of operation when the load is excessive.

H represents a box containing an electric motor (not shown) having a pinion H' on its armature-shaft. This pinion meshes with the idler I on the same shaft with the bevel-gear I', which bevel-gear meshes with the bevel-gear K on the shaft K', (see Fig. 3,) which latter shaft also carries the bevel-gear K². The latter gear meshes with the bevel-gear L on the shaft L', which shaft projects through the bulkhead A and is squared at both ends for the use of a hand-crank. Thus the said shaft may be turned from either side of the bulkhead by hand. The idler I meshes with the spur-gear M, fast on the power-shaft M', which shaft is journaled in bearings B⁵ and B⁶, fast to or cast with the bridge B³.

The said shaft carries a worm-wheel M², which meshes with the worm-rack N, which rack is fast to the door-plate C. It will be seen that this rack is, in effect, a segment of a nut which is engaged by the screw-thread on the worm-wheel, and owing to the peculiar shape of the rack and its engagement with the worm-wheel any particles of coal or other granular matter are pushed out by the worm from between the teeth of the rack, and thus the device automatically cleans itself. This is important where the doors are to be used in coal-bunkers or like places where the parts are likely to become foul.

To protect the various parts, I provide covers whenever practicable, such as the cover M⁴, and when it is required to have access to the parts these covers are preferably secured in place by butterfly-nuts, such as r and h. (Shown in Fig. 1.)

It will be seen that if the electric motor be put in operation it will rotate the worm-wheel M² and will move the door-plate up or down, as the case may be, at the same time the hand-gear will be rotated by the idler I and the bevel-gear I', which are then in rotation. If, however, the electric current is cut off, the parts may be rotated by hand through the interposition of the hand-shaft L' and the chain of gearing connecting the same with the spur-gear M.

The electric motor is put in operation by means of a controller contained in the box R and having its shaft R² pass through the bulkhead, as shown in Fig. 2, with handles R' and R³ on opposite sides of the bulkhead.

To provide against excessive loads being thrown on the electric motor, I provide the automechanical cut-out for breaking the electric circuit when the load on the motor exceeds a predetermined limit. This automechanical cut-out is operated by the mechanism which will now be described.

The power-shaft M' has a limited longitudinal play in its bearings B⁵ and B⁶. On this shaft there is a flange or collar m to receive the downward thrust on the worm-wheel M². Above this worm-wheel M² is a spur-gear M, whose teeth are longer than the idler I, so that this spur-gear may have an axial movement and yet continue in engagement with the idler I. Above this spur-gear M is the spring O, which bears against the cup m⁶, and between this cup and the bearings B⁶ is an antifriction-bearing b⁶. Above the bearing B⁶ is a similar antifriction-bearing b⁶, with its cup m⁶, and above this is a spring O'. The compression of these springs is adjusted by means of the nut M³ on the end of the shaft M'. By screwing down on the nut M³ these springs may be adjusted to any desired compression, and any force tending to move the power-shaft axially either up or down would tend to compress one of these springs still further, at the same time relieving the pressure on the other. The travel of the shaft is positively limited by means of the loose sleeves $O^2$ and $O^3$. It will be seen that any excess of pressure in closing the door will tend to push the worm $M^2$, and with it the shaft, upward, compressing the spring O and easing off the spring O', while any obstruction in opening the door would tend to compress the spring O', relieving the spring O. These springs are so adjusted that the maximum load to be taken up by the motor will compress either one of the springs through a predetermined distance—say three-fourths of an inch—thus allowing a longitudinal motion of the shaft of three-fourths of an inch. This motion of the shaft is taken advantage of to operate an electric cut-out, as follows: The nut $M^3$ rotates with and is pinned to the shaft M', but is provided with an annular groove $m^3$, into which projects a yoke P, adjustably connected, by means of the head P', to the rod $P^2$. This rod travels up and down in the guide $P^3$ and has connected to its lower end the cam-plate $P^4$. The guide $P^3$ is secured to the bearing $B^6$ by an arm and bolt. (Not shown.) This cam-plate has a cam-slot $p$ therein, with cam-faces $p'$ and $p^2$ at each end of said slot. These cam-faces engage two pins $q$ on the end of the shaft Q, which carries the switch Q', which switch makes connection with one or the other of the contacts $Q^2$ and $Q^3$. It will be obvious that when the spring O is compressed this cam-plate will be raised to the position shown in Fig. 11, causing the cam-face $p'$ to rock the switch Q' to the position shown in dotted lines in said figure, thus cutting off the current when excessive resistance is experienced in closing the door. In the same way when in opening the door excessive resistance is encountered the spring O' is compressed, forcing the cam-plate down and causing the cam-face $p^2$ to engage the pin $q$, thus rocking the switch and cutting the current off from the motor. In the normal or running position the pins $q$ would be near the central portion of the cam-slot $p$ and the switch would not operate.

The motor that I employ is preferably compound-wound and operated through a suitable controller T, which I locate in the same box R with the limit-switch. This controller may be of the well-known rotating-cylinder type or other suitable controller and forms no part of my present invention. The limit-switch contacts, however, are so connected to the controller that when the motor is closing the bulkhead-door the main motor-current is sent through the lower limit-switch $Q^3$, while in opening the door the motor-current passes through the upper limit-switch $Q^2$.

The operation will be more clearly understood by referring to Fig. 12. When the door is descending, the controller causes the current to take the following course: from the positive wire of the ship's main X, through the wire 1, contacts $Q^3$, controller, series circuit of motor, and back to the negative main by wire 2. Therefore if the lower limit-switch should be opened by the extra resistance above mentioned the motor will be stopped. When the motor is running to open the door, the current passes from the positive main through wire 3, then directly through the motor, back to the controller and out through wire 4, contacts $Q^2$ of upper limit-switch, and wire 5 to the negative main. Therefore if the extra resistance is thrown in when the door is ascending the upper limit-switch will break the motor-circuit and cause the motor to stop.

The mechanism for operating the door from a distance and the emergency mechanism are described in my application aforesaid and are not a part of my present invention; but it is intended to use these in connection with the apparatus herein described.

Among the advantages of this automechanical cut-out are that it cuts off the motor as soon as the door reaches its open position against the spring-buffer S or closed and locked position. Again, it prevents the motor from being started up to close the door when it is closed or to open the door when it is fully open. Again, it acts as an automatic safety circuit-breaker, cutting off the current at any time before the motor (through some obstruction in the doorway) reaches an overload beyond its safe limit of endurance, and it returns automatically to the normal position as soon as the obstruction causing the excessive overload is removed. Again, it protects the generators of the ship from excessive draft during the emergency operation by limiting the amount of current which may be taken up in one motor. Again, it stops the locking movement at maximum power and not at a position regulated by gearing. This is necessary to insure a water-tight closure. Finally, it prevents any sudden shock or jar on the mechanism.

The sleeves $O^2$ and $O^3$ are provided to limit the travel of the shaft M' and the cam-plate $P^4$ in case of accident to the springs O or O'.

In order to check the speed of the door in opening, I provide a spring-buffer S, fast to a bracket S', for the head of the door when it reaches the open position. The guides $B^4$ are provided for the door when in open position to prevent the same from vibrating when in that position.

It will be obvious that various modifications might be made in the herein-described apparatus which could be used without departing from the spirit of my invention.

Having thus described my invention, what I claim, and desire to secure by Letters Patent of the United States, is—

1. In a system of the character described, the combination with a sliding door or hatch with a rack secured thereto, of a shaft capable of longitudinal movement when subjected to a longitudinal pressure, a gear-wheel fast on said shaft and engaging said rack, an electric motor and gearing for driving said shaft, and an automatical cut-out operated by the longitudinal movement of said shaft for cutting off the current from the electric motor when the load on the motor exceeds a predetermined limit, substantially as described.

2. In a system of the character described, the combination of a sliding door or hatch, of a rack secured thereto, a shaft journaled in fixed bearings but capable of sliding longitudinally therein, with springs limiting the longitudinal travel of said shaft, a gear-wheel fast on said shaft, an electric motor and gearing for driving said shaft, and an automatic cut-out operated by the longitudinal motion of said shaft for cutting off the current from the electric motor when the load on the motor exceeds a predetermined limit, substantially as described.

3. In a system of the character described, the combination with a sliding door or hatch with a rack secured thereto, of a shaft capable of longitudinal movement when subjected to a longitudinal pressure, a gear-wheel fast on said shaft and engaging said rack, an electric motor and gearing for driving said shaft, and an automatic cut-out operated by the longitudinal movement of said shaft when the load on the motor exceeds a predetermined limit, comprising a rod connected to said shaft, a cam-plate carried by said rod, and a switch operated by said cam-plate, substantially as described.

4. In a system of the character described, the combination with a sliding door or hatch with a worm-rack secured thereto, of a shaft capable of longitudinal movement when subjected to a longitudinal pressure, a worm-wheel fast on said shaft and engaging said worm-rack, an electric motor and gearing for driving said shaft, and an automatic cut-out operated by the longitudinal movement of said shaft for cutting off the current from the electric motor when the load on the motor exceeds a predetermined limit, substantially as described.

5. In a system of the character described, the combination of a sliding door or hatch, of a worm-rack secured thereto, a shaft journaled in fixed bearings but capable of sliding longitudinally therein, with springs limiting the longitudinal travel of said shaft, a worm-wheel fast on said shaft, and engaging said worm-rack, an electric motor and gearing for driving said worm-wheel, and an automatic cut-out operated by the longitudinal motion of said shaft for cutting off the current from the electric motor when the load on the motor exceeds a predetermined limit, substantially as described.

6. In a system of the character described, the combination with a sliding door or hatch with a worm-rack secured thereto, of a shaft capable of longitudinal movement when subjected to a longitudinal pressure, a worm-wheel fast on said shaft and engaging said worm-rack, an electric motor and gearing for driving said shaft, and an automatic cut-out operated by the longitudinal movement of said shaft when the load on the motor exceeds a predetermined limit, comprising a rod connected to said shaft, a cam-plate carried by said rod, and a switch operated by said cam-plate, substantially as described.

7. In a system of the character described, the combination with a sliding door or hatch, of a rack secured thereto, a shaft journaled in fixed bearings but capable of sliding longitudinally therein with springs limiting the travel of said shaft, a gear-wheel fast on said shaft, an electric motor and gearing for driving said shaft, and an automatic cut-out operated by said shaft when the load on the motor exceeds a predetermined limit, comprising a rod connected to said shaft, a cam-plate carried by said rod, and a switch operated by said cam-plate, substantially as described.

8. In a system of the character described, the combination of a sliding door or hatch, of a worm-rack secured thereto, a shaft journaled in fixed bearings capable of sliding longitudinally therein, with springs limiting the travel of said shaft, a worm-wheel fast on said shaft, an electric motor and gearing for driving said shaft, and an automatic cut-out operated by said shaft when the load on the motor exceeds a predetermined limit, comprising a rod connected to said shaft, a cam-plate carried by said rod, and a switch operated by said cam-plate, substantially as described.

9. In a system of the character described, the combination of a sliding door or hatch, of a worm-rack secured thereto, a shaft journaled in fixed bearings capable of sliding longitudinally therein with springs limiting the travel of said shaft, means for adjusting the compression of said springs, a worm-wheel fast on said shaft, an electric motor and gearing for driving said worm-wheel, and an automatic cut-out operated by said shaft when the load on the motor exceeds a predetermined limit, substantially as described.

10. In a system of the character described, the combination of a sliding door or hatch, of a worm-rack secured thereto, a shaft journaled in fixed bearings capable of sliding longitudinally therein with springs limiting the travel of said shaft, means for adjusting the compression of said springs, a worm-wheel fast on said shaft, an electric motor and gearing for driving said worm-wheel, and an automatic cut-out operated by said shaft when the load on the motor exceeds a predetermined limit, comprising a rod connected to said shaft, a cam-plate carried by said rod, and a switch operated by said cam-plate, substantially as described.

11. In a system of the character described, the combination of a sliding door or hatch, of a rack secured thereto, a shaft journaled in fixed bearings but capable of sliding longitudinally therein, coil-springs under compression limiting the longitudinal travel of said shaft, a nut on said shaft for adjusting the compression, a gear-wheel fast on said shaft, an electric motor and gearing for driving said shaft and an automatic cut-out operated by the longitudinal motion of said shaft for cutting off the current from the electric motor when the load on the motor exceeds a predetermined limit, substantially as described.

12. In a system of the character described, the combination of a sliding door or hatch, of a worm-rack secured thereto, a shaft journaled in fixed bearings but capable of sliding longitudinally therein, with coil-springs under compression limiting the longitudinal travel of said shaft, a nut on said shaft for adjusting the compression of said springs, a worm-wheel fast on said shaft, an electric motor and gearing for driving said worm-wheel, and an automatic cut-out operated by the longitudinal motion of said shaft for cutting off the current from the electric motor when the load on the motor exceeds a predetermined limit, substantially as described.

13. In a system of the character described, the combination of a sliding door or hatch, of a worm-rack secured thereto, a shaft journaled in fixed bearings but capable of sliding longitudinally therein, with springs and sleeves limiting the longitudinal travel of said shaft, a worm-wheel fast on said shaft, and engaging said worm-rack, an electric motor and gearing for driving said worm-wheel, and an automatic cut-out operated by the longitudinal motion of said shaft for cutting off the current from the electric motor when the load on the motor exceeds a predetermined limit, substantially as described.

14. In a system of the character described, the combination with a sliding door or hatch, of a rack secured thereto, a shaft journaled in fixed bearings but capable of sliding longitudinally therein with springs and sleeves limiting the travel of said shaft, a gear-wheel fast on said shaft, an electric motor and gearing for driving said shaft, and an automatic cut-out operated by said shaft when the load on the motor exceeds a predetermined limit, comprising a rod connected to said shaft, a cam-plate carried by said rod, and a switch operated by said cam-plate, substantially as described.

15. In a system of the character described, the combination of a sliding door or hatch, of a worm-rack secured thereto, a shaft journaled in fixed bearings capable of sliding longitudinally therein, with springs and sleeves limiting the travel of said shaft, a worm-wheel fast on said shaft, an electric motor and gearing for driving said shaft, and an automatic cut-out operated by said shaft when the load on the motor exceeds a predetermined limit, comprising a rod connected to said shaft, a cam-plate carried by said rod, and a switch operated by said cam-plate, substantially as described.

16. In a system of the character described, the combination of a sliding door or hatch, of a worm-rack secured thereto, a shaft journaled in fixed bearings capable of sliding longitudinally therein with springs and sleeves limiting the travel of said shaft, means for adjusting the compression of said springs, a worm-wheel fast on said shaft, an electric motor and gearing for driving said worm-wheel, and an automatic cut-out operated by said shaft when the load on the motor exceeds a predetermined limit, substantially as described.

17. In a system of the character described, the combination of a sliding door or hatch, of a worm-rack secured thereto, a shaft journaled in fixed bearings capable of sliding longitudinally therein with springs and sleeves limiting the travel of said shaft, means for adjusting the compression of said springs, a worm-wheel fast on said shaft, an electric motor and gearing for driving said worm-wheel, and an automatic cut-out operated by said shaft when the load on the motor exceeds a predetermined limit, comprising a rod connected to said shaft, a cam-plate carried by said rod, and a switch operated by said cam-plate, substantially as described.

18. In a system of the character described, the combination of a sliding door or hatch, of a rack secured thereto, a shaft journaled in fixed bearings but capable of sliding longitudinally therein, coil-springs under compression on said shaft, and sleeves limiting the longitudinal travel of said shaft, a nut on said shaft for adjusting the compression, a gear-wheel fast on said shaft, an electric motor and gearing for driving said shaft and an automatic cut-out operated by the longitudinal motion of said shaft for cutting off the current from the electric motor when the load on the motor exceeds a predetermined limit, substantially as described.

19. In a system of the character described, the combination of a sliding door or hatch, of a worm-rack secured thereto, a shaft journaled in fixed bearings but capable of sliding longitudinally therein, with coil-springs under compression on said shaft, and sleeves limiting the longitudinal travel of said shaft, a nut on said shaft for adjusting the compression of said springs, a worm-wheel fast on said shaft, an electric motor and gearing for driving said worm-wheel, and an automatic cut-out operated by the longitudinal motion of said shaft for cutting off the current from the electric motor when the load on the motor exceeds a predetermined limit, substantially as described.

20. In a system of the character described, the combination with a door and means for moving the same, of wedges fast to the frame of the door, roller-bars carrying rollers mounted between the door and said wedges, and means automatically operated by the motion of the door for moving said roller-bars longitudinally and causing said rollers to engage said wedges as the door nears the closed position, substantially as described.

21. In a system of the character described, the combination with a door carrying wedges on the two edges transverse to its movement and rollers on the door-frame adapted to engage said wedges as the door nears the closed position, of wedges secured to the door-frame and arranged along the longitudinal sides of the door, roller-bars carrying rollers mounted between said wedges and the door, and means for moving said roller-bars longitudinally and causing said rollers to ride up said wedges as the door nears the closed position, substantially as described.

22. In a system of the character described, the combination with a door and means for moving the same, of wedges fast to the frame of the door, roller-bars carrying rollers mounted between the door and said wedges, crank-arms connected to said roller-bars, and hooks secured to the door for moving said crank-arms and roller-bars as the door nears the closed position, or as it begins to open, substantially as described.

23. In a system of the character described, the combination with a door carrying wedges in the two edges transverse to its movement and rollers on the door-frame adapted to engage said wedges as the door nears the closed position, of wedges secured to the door-frame and arranged along the longitudinal sides of the door, roller-bars carrying rollers mounted between said wedges and the door, crank-arms connected to said roller-bars, and hooks secured to the door for moving said crank-arms and roller-bars as the door nears the closed position, or as it begins to open, substantially as described.

24. In a system of the character described, the combination with a door, of a worm-rack secured thereto, a worm-wheel meshing in said rack, a spur-gear driving said worm-wheel, an idler driving said spur-gear, a pinion driving said idler, an electric motor driving said pinion, of a bevel-gear mounted on the same shaft with said idler, and a gearing operated by hand from either side of the bulk-head for driving said bevel-gear, substantially as described.

In testimony whereof I affix my signature in presence of two witnesses.

WILLIAM BARNUM COWLES.

Witnesses:
   CHAS. J. METZ,
   HOMER E. DANIELS.